(12) United States Patent
Lee et al.

(10) Patent No.: US 10,946,849 B2
(45) Date of Patent: Mar. 16, 2021

(54) BRAKE SYSTEM FOR VEHICLE

(71) Applicants: Hyundai Motor Company, Seoul (KR); Kia Motors Corporation, Seoul (KR)

(72) Inventors: Joung Hee Lee, Gyeonggi-do (KR); Jong Yun Jeong, Gyeonggi-do (KR); Dong Yoon Hyun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 29 days.

(21) Appl. No.: 16/160,061

(22) Filed: Oct. 15, 2018

(65) Prior Publication Data
US 2019/0308600 A1   Oct. 10, 2019

(30) Foreign Application Priority Data
Apr. 10, 2018 (KR) .................. 10-2018-0041318

(51) Int. Cl.
| | | |
|---|---|---|
| *B60T 8/92* | (2006.01) | |
| *B60T 13/68* | (2006.01) | |
| *B60T 13/58* | (2006.01) | |
| *B60T 8/40* | (2006.01) | |
| *B60T 7/04* | (2006.01) | |
| *B60T 8/176* | (2006.01) | |
| *B60T 8/1755* | (2006.01) | |
| *B60T 13/16* | (2006.01) | |
| *B60T 13/74* | (2006.01) | |

(52) U.S. Cl.
CPC ............ *B60T 13/686* (2013.01); *B60T 7/042* (2013.01); *B60T 8/176* (2013.01); *B60T 8/1755* (2013.01); *B60T 8/4081* (2013.01); *B60T 13/161* (2013.01); *B60T 13/58* (2013.01); *B60T 13/741* (2013.01); *B60T 2270/10* (2013.01); *B60T 2270/30* (2013.01); *B60T 2270/402* (2013.01); *B60T 2270/404* (2013.01); *B60T 2270/82* (2013.01)

(58) Field of Classification Search
CPC . B60T 7/042; B60T 8/94; B60T 13/58; B60T 13/146; B60T 13/161; B60T 13/686; B60T 17/221
USPC ........................... 303/114.1, 115.2; 60/547.1
See application file for complete search history.

(56) References Cited

U.S. PATENT DOCUMENTS

| | | | |
|---|---|---|---|
| 9,346,443 B2* | 5/2016 | Koo ................. | B60T 13/146 |
| 2011/0031072 A1* | 2/2011 | Leiber .............. | B60T 8/00 |
| | | | 188/72.3 |
| 2011/0115282 A1* | 5/2011 | Dinkel .............. | B60T 7/042 |
| | | | 303/3 |
| 2014/0225425 A1 | 8/2014 | Drumm et al. | |
| 2014/0333124 A1* | 11/2014 | Koo .................. | B60T 7/042 |
| | | | 303/10 |
| 2016/0082938 A1* | 3/2016 | Vollert ............. | B60T 11/224 |
| | | | 303/115.2 |
| 2016/0167632 A1* | 6/2016 | Deng ................ | B60T 7/042 |
| | | | 701/70 |

(Continued)

*Primary Examiner* — Christopher P Schwartz
(74) *Attorney, Agent, or Firm* — Mintz Levin Cohn Ferris Glovsky and Popeo, P.C.; Peter F. Corless

(57) ABSTRACT

A brake system for a vehicle is provided to independently adjust a braking pressure of each wheel. The system includes a hydraulic pressure brake driven by two actuators and a sub-cylinder and valve configurations that are disposed in the peripheral flow path thereof to eliminate the pressure unbalance generated in the hydraulic pressure brake.

20 Claims, 12 Drawing Sheets

(56) References Cited

U.S. PATENT DOCUMENTS

| | | | |
|---|---|---|---|
| 2016/0200307 A1* | 7/2016 | Feigel | B60T 8/4081 |
| | | | 303/6.01 |
| 2018/0186353 A1* | 7/2018 | Lee | B60T 8/94 |
| 2019/0031165 A1* | 1/2019 | Besier | B60T 13/686 |
| 2019/0308601 A1* | 10/2019 | Maj | B60T 8/326 |

* cited by examiner

BRAKE SYSTEM FOR VEHICLE

CROSS-REFERENCE TO RELATED APPLICATION

This application claims under 35 U.S.C. § 119(a) the benefit of priority to Korean Patent Application No. 10-2018-0041318 filed on Apr. 10, 2018, the entire contents of which are incorporated herein by reference.

BACKGROUND

(a) Technical Field

The present invention relates to a brake system for a vehicle and more particularly, to a brake system for a vehicle capable of independently controlling the braking force of the vehicle wheels.

(b) Background Art

Recently, a brake-by-wire technology which controls vehicle braking by applying an electronic control system has been developed for a brake system of a vehicle instead of a conventional general hydraulic pressure control system. In such an electronic control brake system, the required hydraulic pressure is generated using an electric motor based on the braking intention of a driver, and the braking force is generated by transmitting the hydraulic pressure generated by the driving of the motor to the wheel brake (wheel cylinder) of each wheel.

The electronic control brake system, which adjusts the hydraulic pressure with an electronic actuator, is usually referred to as an electro-hydraulic brake system (EHB), that is, an electronic hydraulic pressure brake system. The electronic hydraulic pressure brake system is able to individually adjust the braking force generating at each wheel, and thus it is possible to implement functions such as an electronic stability control (ESC) or an anti-lock brake system (ABS). In a conventional electronic hydraulic pressure brake system, a pump including a motor is used as the above-mentioned electronic actuator. In this system, as the motor is driven, a piston moves forward and backward, and the piston presses brake oil in the chamber of a cylinder to form hydraulic pressure.

Furthermore, in the electronic hydraulic pressure brake system, after sensing the pedal stroke by the pedal operation using a sensor, the braking force of each wheel is adjusted by the hydraulic pressure generated by the pump through the motor drive. In addition, in the electronic hydraulic pressure brake system, a pedal simulator is provided that allows the driver to feel the same pedal pressure as in a conventional general hydraulic pressure brake system. Thus, when the driver engages a pedal connected to a backup master cylinder, the hydraulic pressure of the brake oil inside the backup master cylinder increases and the hydraulic pressure inside the backup master cylinder is transmitted to the pedal simulator through a pedal hydraulic pressure line to generate a pedal feel.

Furthermore, when the driver engages the brake pedal, a controller calculates a desired target hydraulic pressure of the driver based on a driver pedal input value (e.g., a brake input value) sensed using a brake pedal sensor (e.g., a pedal stroke sensor), i.e., a pedal stroke value, and then adjusts the drive of the motor based on the calculated target hydraulic pressure to generate a hydraulic pressure in the pump. Thus, the hydraulic pressure generated by the pump is transmitted to each wheel cylinder to obtain the desired braking force.

A developed technology of the related art discloses a braking system including a main motor for operating four wheels in a normal operation and a plurality of valves installed on hydraulic pressure lines at each wheel side. Particularly, an auxiliary motor is provided for responding to a failure when the main motor fails. However, the auxiliary motor operates only in the event of the failure, vehicle weight and production costs may be adversely effected.

The above information disclosed in this section is merely for enhancement of understanding of the background of the invention and therefore it may contain information that does not form the prior art that is already known in this country to a person of ordinary skill in the art.

SUMMARY

The present invention provides a brake system for a vehicle capable of simplifying a braking system structure including a plurality of valve elements and independently adjusting the braking pressure of each wheel. Furthermore, the present invention provides a brake system for a vehicle configured not to generate an unexpected biased braking during rapid braking to improve the stability of the straight ahead of the vehicle. In addition, the present invention provides a brake system for a vehicle including a fail-safe mode that may be effectively responsive to various failure situations. It means maintaining the movement of the straight ahead of the vehicle by preventing the unexpected biased braking during the rapid braking.

In order to achieve the above object, an exemplary embodiment of the present invention may include a pedal to which a braking input is applied; an actuator configured to generate a braking hydraulic pressure in response to the braking input applied to the pedal and including a first actuator having a first hydraulic chamber and a second actuator having a second hydraulic chamber; wheel brakes connected with the first actuator and the second actuator; and a sub-cylinder including two sub-pistons for forming a third hydraulic chamber and a fourth hydraulic chamber, which are two hydraulic chambers continuously disposed within a housing.

The sub-cylinder may include a first sub-piston disposed centrally and a second sub-piston connected to the pedal. The first hydraulic chamber may be connected with the third hydraulic chamber by a flow path in which a first valve is installed, the second hydraulic chamber may be connected with the fourth hydraulic chamber by a flow path in which a second valve is installed, and pressure balancing may be performed by the sub-cylinder when a difference is generated between braking hydraulic pressures generated by the first actuator and the second actuator.

According to an exemplary embodiment of the present invention, since the braking pressure of each wheel may be independently adjusted by two motors, independent control performance for each wheel may be improved for ABS and ESC control, and so on. Furthermore, according to the present invention, it may be possible to distribute the pressure to the left and right wheels evenly while simplifying the structure of the braking system, and as a result, it may be possible to improve the stability of the straight ahead of the vehicle by fundamentally preventing a biased braking which may occur during rapid braking.

In addition, according to the exemplary embodiment of the present invention, even if any of the actuators for generating the braking pressure fails, it may be possible to control the braking of both the left and right wheels with the remaining actuators, to thus improve the failure robustness of the braking system. Even when a piping of the hydraulic pressure line is broken, it may be possible to perform the braking control with the broken piping completely separated, to prevent the power loss even when the piping is broken.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
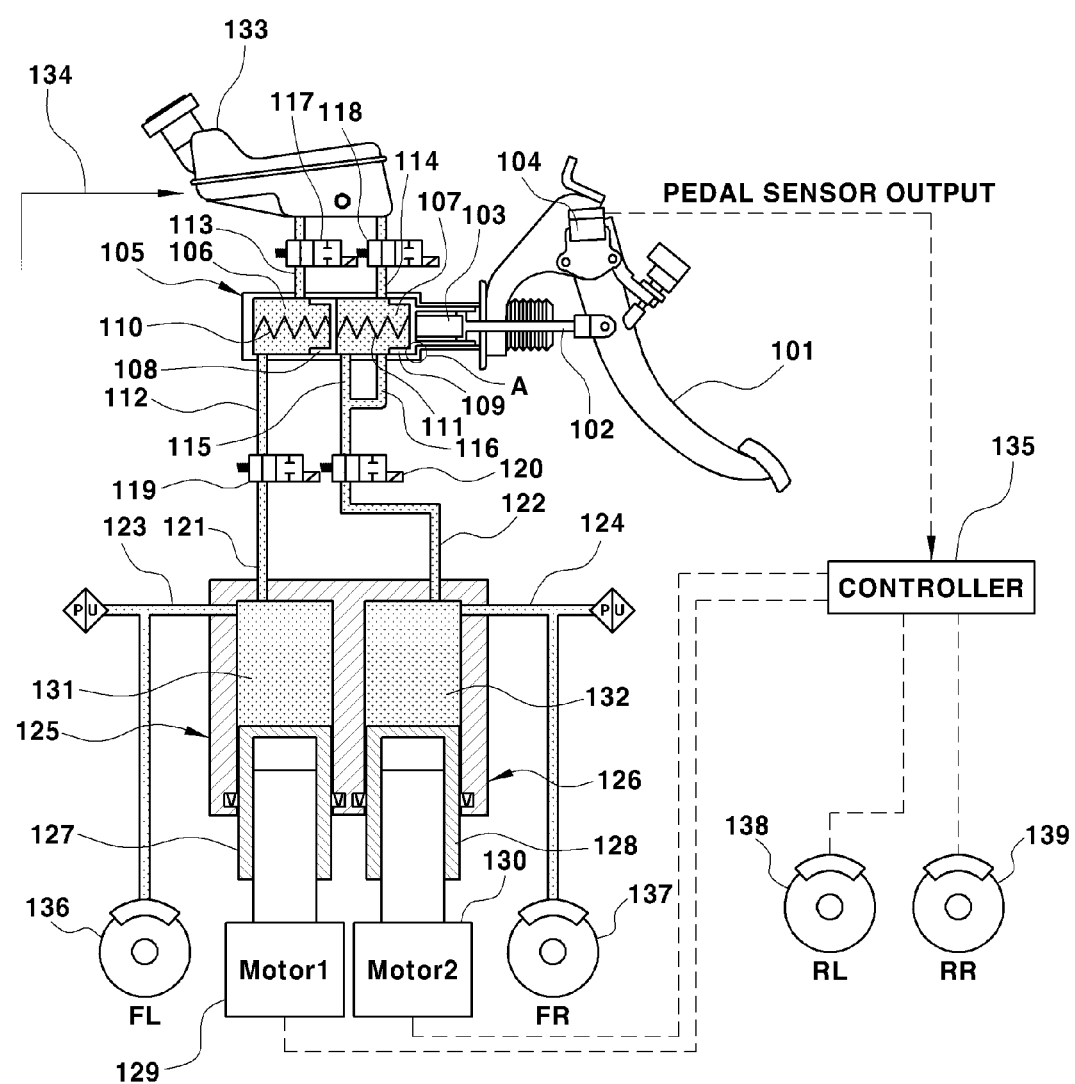
FIG. 1 schematically illustrates the configuration of a braking system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 shows a braking system for a vehicle according to an exemplary embodiment of the present invention including a front wheel braking module connected from a pedal and configured to be braked by two actuators, respectively.

In the exemplary embodiment of FIG. 1, a hydraulic pressure brake driven by an actuator may be installed on front wheels and an electronic brake may be disposed on rear wheels, which operates based on a pedal sensor output. Particularly, since the hydraulic pressure brake of the front wheels may form hydraulic pressure by two actuators, the left and right wheels of the front wheels may be operated independently. Furthermore, since the rear wheels may be provided with wheel brakes 138 and 139 constituted by the electronic brake, all four wheels may be operated independently in the exemplary embodiment of FIG. 1.

On the other hand, according to the present invention, either the front wheels or the rear wheels should consist of a hydraulic pressure brake and the hydraulic pressure brake should be composed of a braking module braked by hydraulic pressure using two actuators. FIG. 1 shows an exemplary embodiment in which the front wheels are braked by hydraulic pressure. Unlike FIG. 1, the rear wheels may be braked by hydraulic pressure and the front wheels may be braked by the electronic brake.

In the following description of the present invention, a description will be given based on an example in which the braking module for the front wheels is a hydraulic pressure brake driven by two actuators. However, those skilled in the art will recognize that the present invention is not limited to this exemplary embodiment, and that it may be equally applied to an example of the braking module for the rear wheels configured to the hydraulic pressure brake. Accordingly, the present invention should not be construed as limited to the accompanying drawing and examples set forth below, but should be construed as including various modifications.

Referring to FIG. 1, the braking module for the front wheels may be an electronic hydraulic pressure brake system driven by two actuators. The braking module for the front wheels may be connected with a pedal 101 configured to receive the braking input of the driver, that is, the input by the driver engaging the pedal.

The braking module for the front wheels may include a pedal simulator 103 which allows the driver to feel the same pedal pressure as in a conventional hydraulic pressure brake. Specifically, as shown in FIG. 1, the pedal 101 (e.g., the shaft of the pedal) may be connected to a piston rod 102, and the piston rod 102 may be connected to the pedal simulator 103. Accordingly, as the driver engages or depresses the pedal, the piston rod 102 may move backward, and the driver may experience a pedal feeling through the operation of the pedal simulator 103.

Furthermore, a pedal sensor 104 configured to detect the braking input through the pedal 101 may be also installed in the braking system. The pedal sensor 104 may be configured to detect the pedal stroke of the driver and operate the braking system based on the detected pedal stroke. In particular, a controller 135 may be configured to receive a signal for the pedal input, i.e., the pedal sensor output, and adjust the relevant configurations to generate a target braking force based on the output signal. The controller 135 may be configured to operate the hydraulic pressure brake and the electronic brake, respectively. Thus, the controller 135 may be configured to receive the pedal sensor output, operate the actuator for each wheel and brake each wheel with the generated braking force.

In this regard, the exemplary embodiment of the present invention may be configured to include two actuators for independently driving the left and right wheels of the front wheels, respectively. The actuator in the present invention may include a drive source configured to supply the appropriate hydraulic pressure to each wheel. The exemplary embodiment of the present invention may include a cylinder and a piston forming a hydraulic chamber and a motor configured to move the piston to pressurize the fluid. However, the configuration of the actuator is not limited to the above-mentioned example, and may be changed to a suitable structure for driving the hydraulic pressure brake.

Specifically, as shown in FIG. 1, the exemplary embodiment of the present invention may include an actuator for the left wheel and an actuator for the right wheel. A first actuator for the left wheel may include a first main piston 127 and a first main cylinder 125 for forming a first hydraulic chamber 131 and include a first motor 129 for driving the first main piston 127. The second actuator for the right wheel also may include a second main piston 128, a second main cylinder 126 to form a second hydraulic chamber 132 and a second motor 130, in the same configuration as for the left wheel.

The first hydraulic chamber 131 may be connected to a wheel braking portion 136 side of the left wheel through a flow path 123 formed at a first side and connected to a sub-cylinder 105 side via a flow path 121 connected to a second side. Likewise, the second hydraulic chamber 132 may be connected to a wheel braking portion 137 side of the right wheel via a flow path 124 formed on a first side, and connected to the sub-cylinder 105 side via a flow path 122 connected to a second side.

The sub-cylinder 105 and the first hydraulic chamber 131 may be connected by flow paths 112 and 121, and the flow paths 112 and 121 may be configured to be opened or closed by a first valve 119. A second valve 120 may be also installed in flow paths 115, 116, and 122 that connect the sub-cylinder 105 and the second hydraulic chamber 132. The first hydraulic chamber 131 and the second hydraulic chamber 132 may be selectively separated through the first valve 119 and the second valve 120. A normally open valve may be used as the first valve 119 and the second valve 120. The functions of this first valve 119 and the second valve 120 will be described in more detail below while describing FIG. 3A to FIG. 3B.

The sub-cylinder 105 may include two sub-pistons 108 and 109 for forming two hydraulic chambers that are disposed continuously. The two hydraulic chambers formed in the sub-cylinder, i.e. a third hydraulic chamber 106 and a fourth hydraulic chamber 107, may be connected to a reservoir 133 side respectively through flow paths 113 and 114. The two sub-pistons 108 and 109 in the sub-cylinder 105 may be configured to be movable in the longitudinal direction within the sub-cylinder 105. As the two sub-pistons 108 and 109 move, the flow path connected to the reservoir 133 may be blocked. In other words, as shown in FIG. 1, the sub-pistons 108 and 109 may include a piston head having a predetermined length that extends along the inner wall of the sub-cylinder 105. When the sub-pistons 108 and 109 are positioned at the correctly aligned positions, the outer surfaces of the piston heads may block the flow path connected to the reservoir 133 side. Furthermore, a return line 134 for the fluid returning to the reservoir 133 may also be provided.

The reservoir 133 may include a third valve 117 and a fourth valve 118 to open or close the flow path connected to the third hydraulic chamber 106 and the fourth hydraulic chamber 107. The third valve 117 and the fourth valve 118 may be opened to connect the reservoir side to the sub-cylinder 105 before the braking and closed when braking. Additionally, the third valve 117 and the fourth valve 118 both may include normally open valves. Restoring springs 110 and 111 may be accommodated in the third hydraulic chamber 106 and the fourth hydraulic chamber 107, respectively and may determine the initial position of the sub-pistons in the state before braking. These restoring springs 110 and 111 may be configured to provide restoring forces for returning to an initial position even when the sub-pistons move through a pressure balancing process or the like.

The sub-cylinder 105 may include flow paths connected to the main cylinder side, respectively. Particularly, a flow path 112 may be connected with the third hydraulic chamber 106 of the sub-cylinder 105, and the fourth hydraulic chamber 107 adjacent to the pedal part 101 side may have a "y"-type flow path structure having two inlet ports and one outlet port based on the sub-cylinder 105 side. Accordingly, the fourth hydraulic chamber 107 may include a first flow path 115 proximate to the first sub-piston 108 side and a second flow path 116 proximate to the pedal part 101 side and joined with the flow path 115.

The two inlet ports of the "y"-type flow path may be disposed forward and back along the longitudinal direction of the sub-cylinder 105. The two inlet ports may be disposed to be spaced apart from each other along the moving direction of the sub-piston. The two inlet ports may be formed to transmit the hydraulic pressure through the other one of the flow paths even if one of the flow paths is closed as the sub-piston moves. In other words, the hydraulic pressure may be transmitted through the flow path that is open while the other of the two remains closed.

Figure 2A:
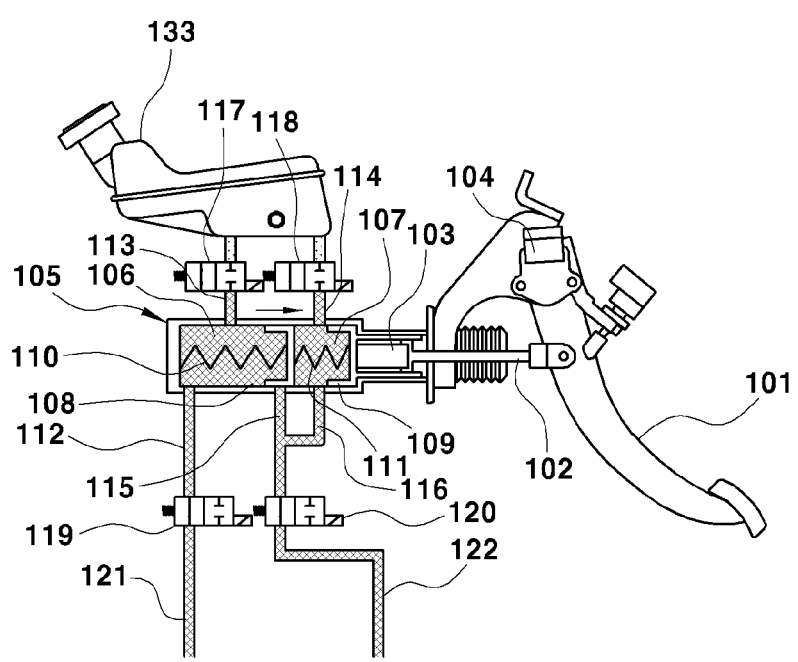
FIG. 2A shows a sub-cylinder connected to a pedal and left and right hydraulic pressure lines connected thereto in a front wheel braking module according to an exemplary embodiment of the present invention where the pressure balancing is performed by the sub-cylinder when the pressure on a left wheel is high.
Figure 2B:
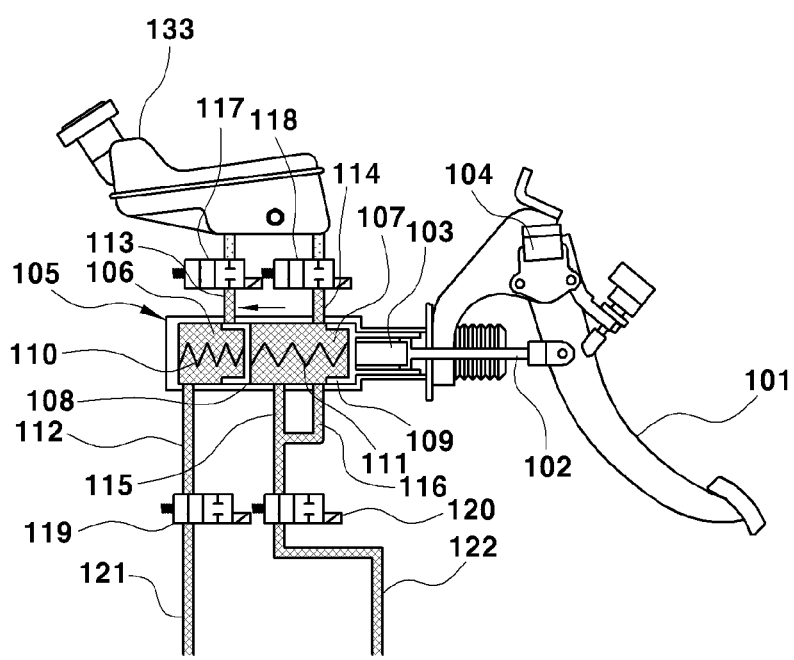
FIG. 2B shows that the pressure balancing is performed by the sub-cylinder when the pressure on a right wheel is high according to an exemplary embodiment of the present invention.

The sub-cylinder 105 may be partitioned into two hydraulic chambers 106 and 107 by the first sub-piston 108. Particularly, the sub-cylinder 105 may include an inlet side structure with a stepped portion A, and the second sub-piston 109 also may include a corresponding structure. Accordingly, the portion where the second sub-piston 109 is connected to the pedal part side has a relatively small outer diameter, and the portion that extends toward the fourth hydraulic chamber 107 side has a relatively large outer diameter. In the state before braking, the second sub-piston 109 may be positioned to abut the stepped portion A of the sub-cylinder 105. In this specification, the piston having the stepped portion is referred to as a stepped piston. The stepped piston may prevent the second sub-piston 109 from being pushed toward the pedal 101 to provide a sense of discomfort to the driver during the pressure balancing process. In other words, as shown in FIGS. 2A and 2B, even if pressure balancing is performed, the sub-piston may be unable to move to the pedal 101 side by the stepped portion of the sub-cylinder 105, and thus, the pedal 101 may be prevented from moving toward the driver's foot. Therefore, even if pressure balancing is performed, unnecessary force may not be transmitted to the driver through the pedal 101.

However, the exemplary embodiment of the present invention exemplifies the second sub-piston 109 of the stepped type, but the present invention is not limited to such the stepped piston, and it should be understood that any structure capable of preventing the pedal from being pushed in a pressure balancing process may be applied without limitation. On the other hand, the first sub-piston 108 may be installed at the center of the sub-cylinder 105 to separate two hydraulic chambers at the center of the sub-cylinder 105, and configured to physically separate the third hydraulic chamber 106 from the fourth hydraulic chamber 107.

Further, the first sub-piston 108 may be movable within the sub-cylinder 105 based on the pressure difference provided by both actuators, i.e., the pressure difference between the third hydraulic chamber 106 and the fourth hydraulic chamber 107. Particularly, the first sub-piston 108 may perform the pressure balancing function of equalizing both pressures by canceling the pressure difference on both sides while operating in conjunction with the flow paths 112, 115, and 116 connected to the first hydraulic chamber 131 and the second hydraulic chamber 132.

For example, when the vehicle is stopped suddenly by engagement of a brake pedal, the pressure between the left and right brakes will be generated during the initial braking, and thus, the temporary biased braking may be generated deteriorating the stability of the straight ahead of the vehicle. At this time, in the present invention, the pressure balancing function at the sub-cylinder 105 may fundamentally prevent the occurrence of the biased braking.

This process of pressure balancing is shown in FIGS. 2A and 2B. Specifically, FIG. 2A shows selectively the sub-cylinder 105 connected to the pedal 101 and the left and right hydraulic pressure lines connected to the sub-cylinder 105 and shows that pressure balancing is performed when the pressure on the left wheel is high. In other words, in FIG. 2A, since the pressure in the first hydraulic chamber 131 on the left wheel is higher than the pressure in the second hydraulic chamber 132 on the right wheel, the first sub-piston 108 moves to the right in response to this pressure difference, and thus, the fluid in the right fourth hydraulic chamber 107 may be pressurized. Therefore, as the first sub-piston 108 moves to the right direction while applying a force to the right side, the left and right pressure difference may be canceled, and the left and right pressure balancing may be performed.

At this time, the flow path 115 may be closed by the first sub-piston 108, and the braking force by the pressure balancing may be transmitted to the second hydraulic chamber 132 through the opened flow path 116. Therefore, applying "y" type flow path to the fourth hydraulic chamber 107 side in this exemplary embodiment, as in the example of FIG. 2A, may prevent the pressure balancing function of the sub-cylinder 105 from being lost due to the fact that the specific flow path is closed by the first sub-piston 108. The third valve 117 and the fourth valve 118 on the reservoir side should be in the off state, and the first valve 119 and the second valve 120 should be in the open state. As shown in FIG. 3G, when both actuators fail and braking is performed by the pedaling force, the front-end flow path 116 of the sub-cylinder may be closed. The hydraulic pressure may then be transmitted to the wheel side by the remaining flow path 115.

Further, FIG. 2B shows pressure balancing performed by the sub-cylinder 105 when the pressure in the second hydraulic chamber 132 on the right wheel is higher than the pressure in the first hydraulic chamber 131 on the left wheel. In particular, since the pressure on the right side is higher, the first sub-piston 108 may be moved to the left, and a braking force by pressure balancing may be transmitted to the first hydraulic chamber 131 by the flow path 112.

Figure 2C:
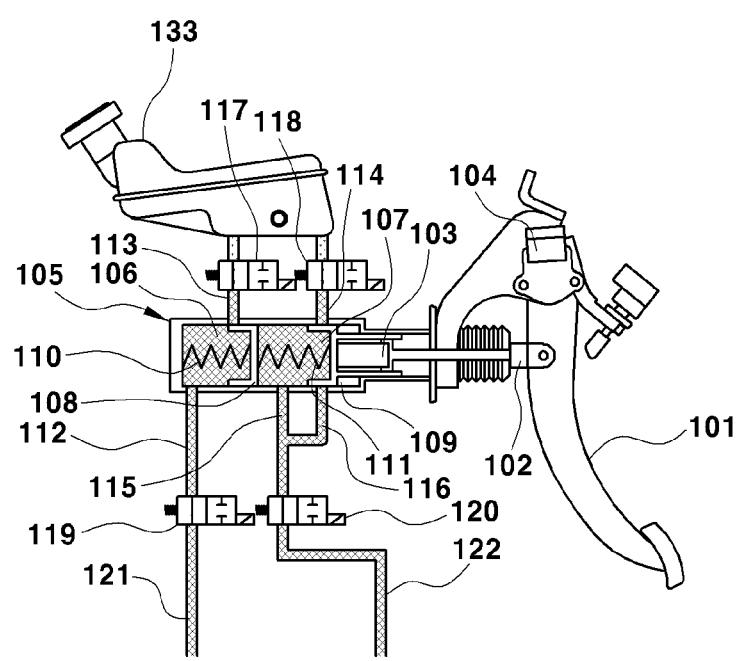
FIG. 2C illustrates that backup brake is performed by a pedaling force when an electrical failure occurs according to an exemplary embodiment of the present invention.

FIG. 2C shows the backup braking state by the driver's pedaling force or engagement in the event of an electrical failure. In this backup braking state, all the first to fourth valves must be opened. Thus, when all the first to fourth valves apply normally open valves, all valves may remain open even in the event of an electrical failure. With all the valves open, all the first sub-piston 108 and the second sub-piston 109 may move backward by the pedaling force, and thus, the braking force by the pedaling force may be transmitted to the wheel brakes 136 and 137. As shown in FIG. 2C the second sub-piston 109 may close the flow path 116, but since another flow path 115 to the fourth hydraulic chamber 107 is open, the pedaling force may be transmitted sufficiently to the side of second hydraulic chamber 132.

Further, the flow path 112 connected to the third hydraulic chamber 106 may be formed at the rear end of the sub-cylinder 105, i.e., spaced apart or at a distance from the pedal 101, and thus, the third hydraulic chamber 106 may be connected to the first hydraulic chamber 131 side without being interfered with the movement of the first sub piston. The internal structures of the flow paths 112, 115, and 116 and the sub-cylinder 105 contribute significantly to achieve the pressure balancing and backup braking functions while substantially reducing the size of the sub-cylinder 105.

Figure 3A:
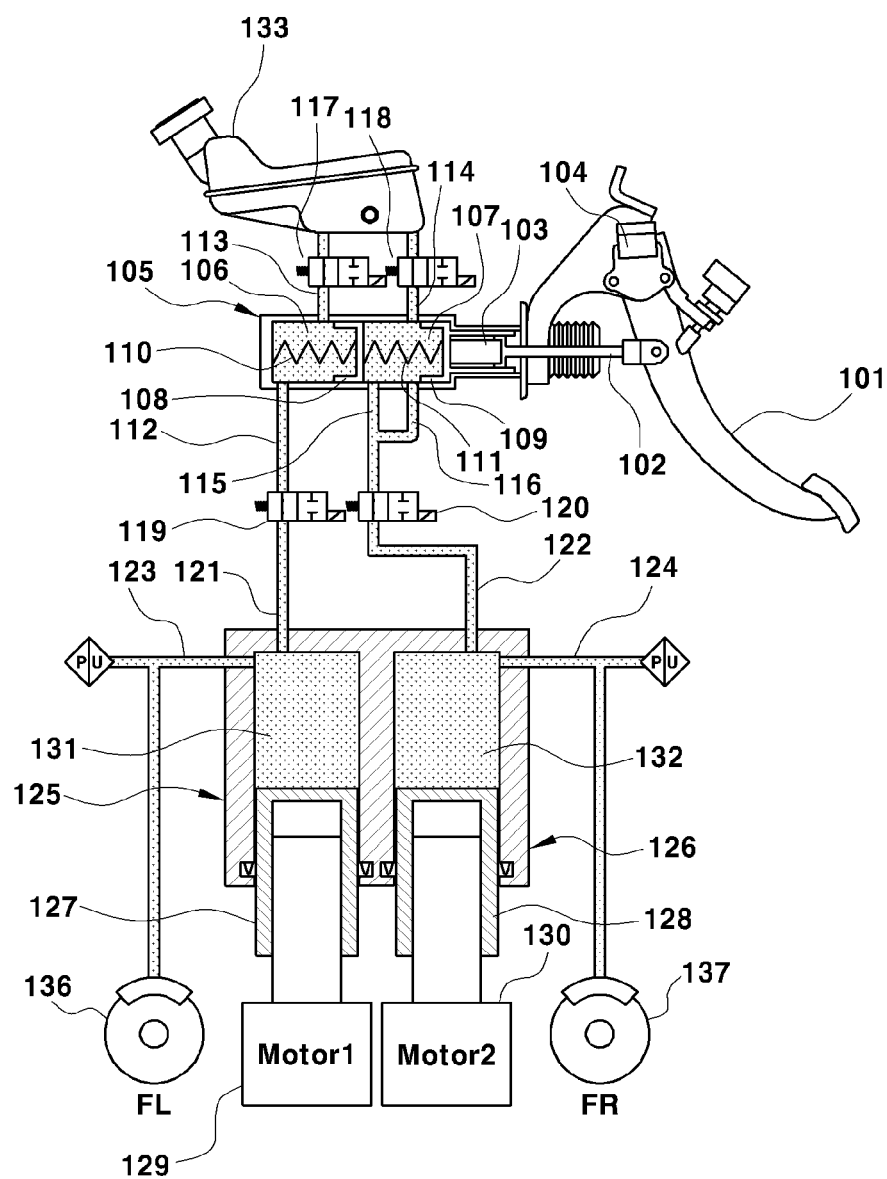
FIG. 3A shows an initial state of the braking system for a vehicle before braking according to an exemplary embodiment of the present invention.
Figure 3B:
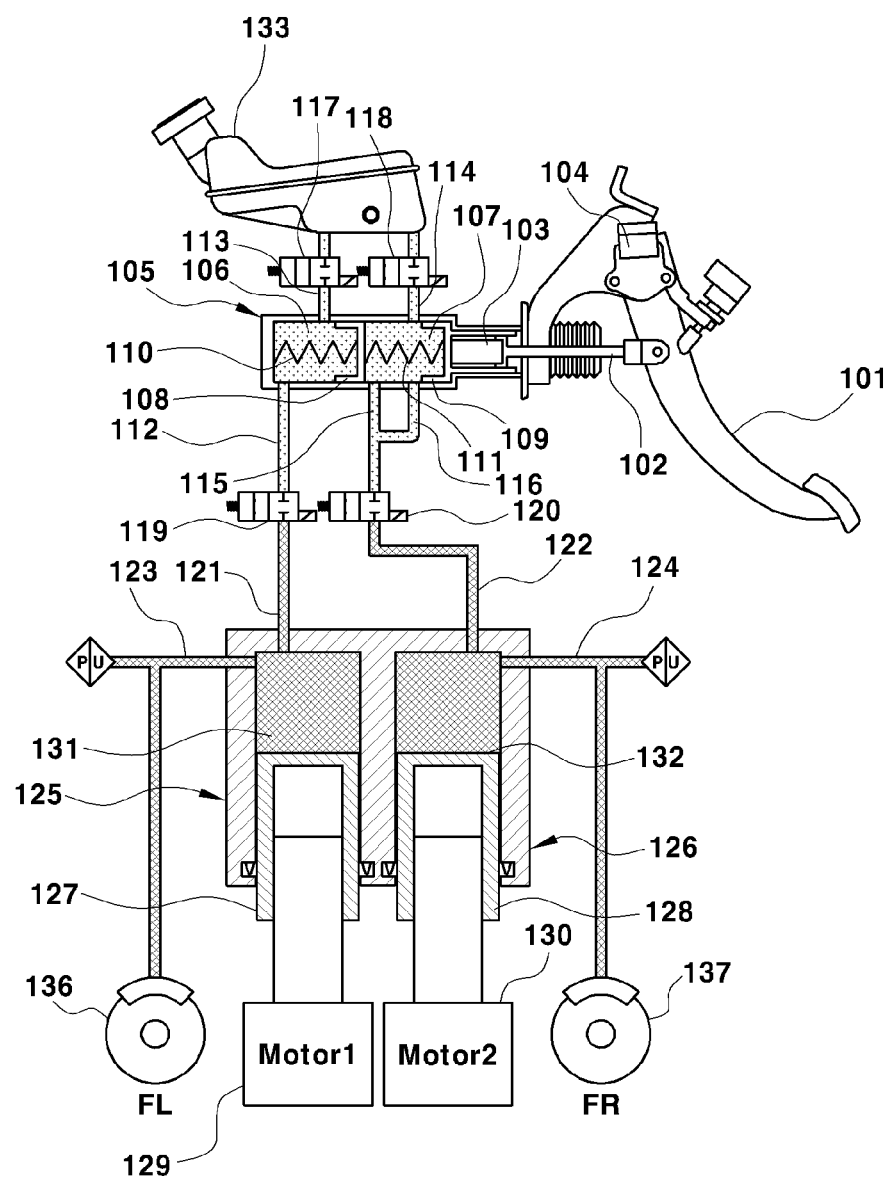
FIG. 3B shows the operation of the braking system of the vehicle during normal braking according to an exemplary embodiment of the present invention.
Figure 3C:
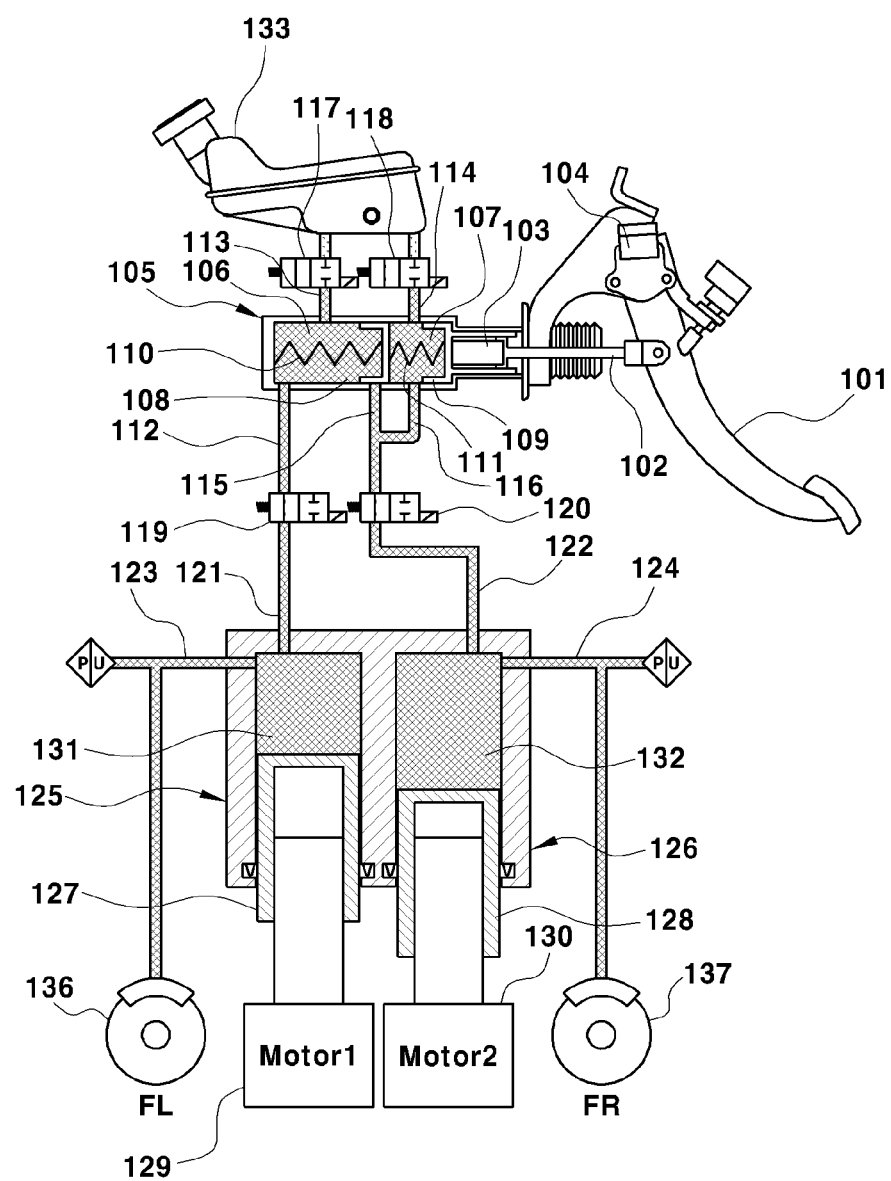
FIG. 3C shows a state in which the left and right braking forces are braked equally during rapid braking according to an exemplary embodiment of the present invention.
Figure 3D:
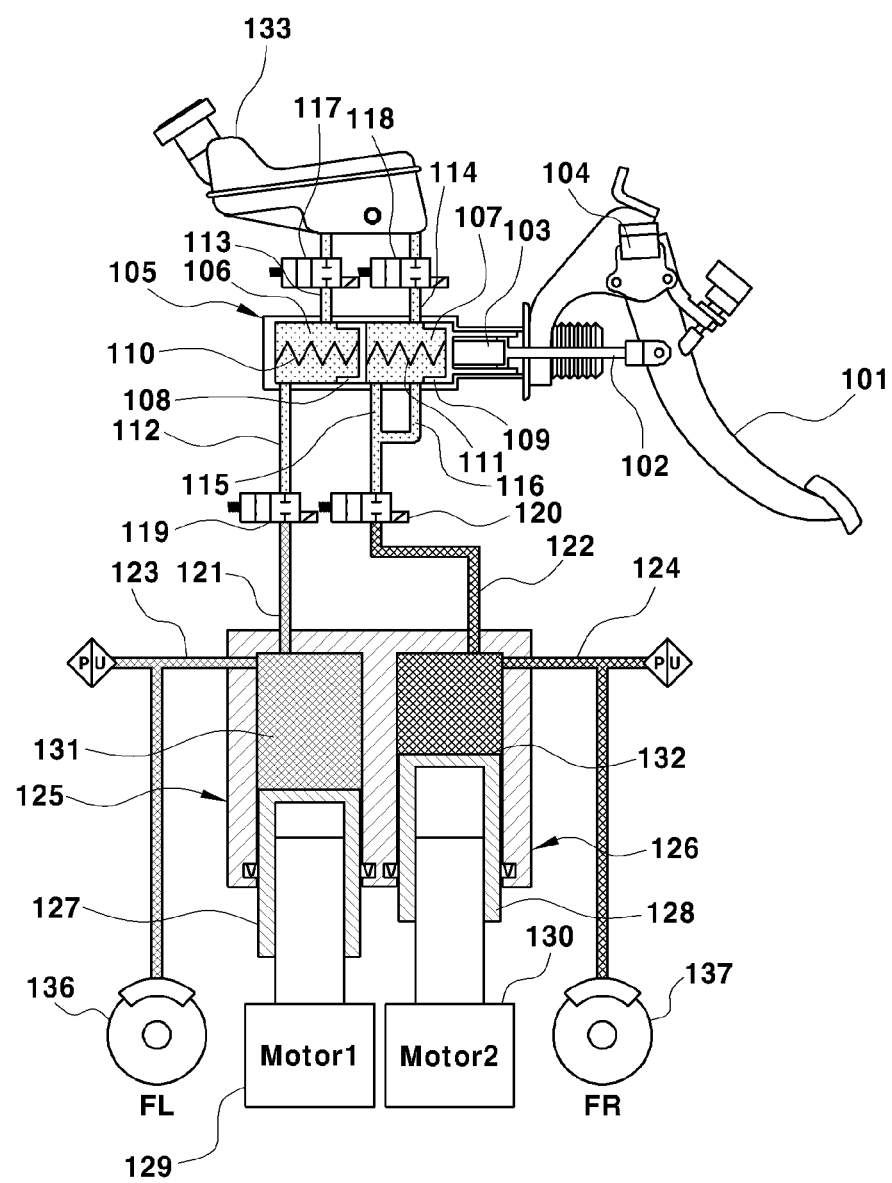
FIG. 3D shows that independent control is applied to the left and right wheels during ABS or ESC control according to an exemplary embodiment of the present invention.
Figure 3E:
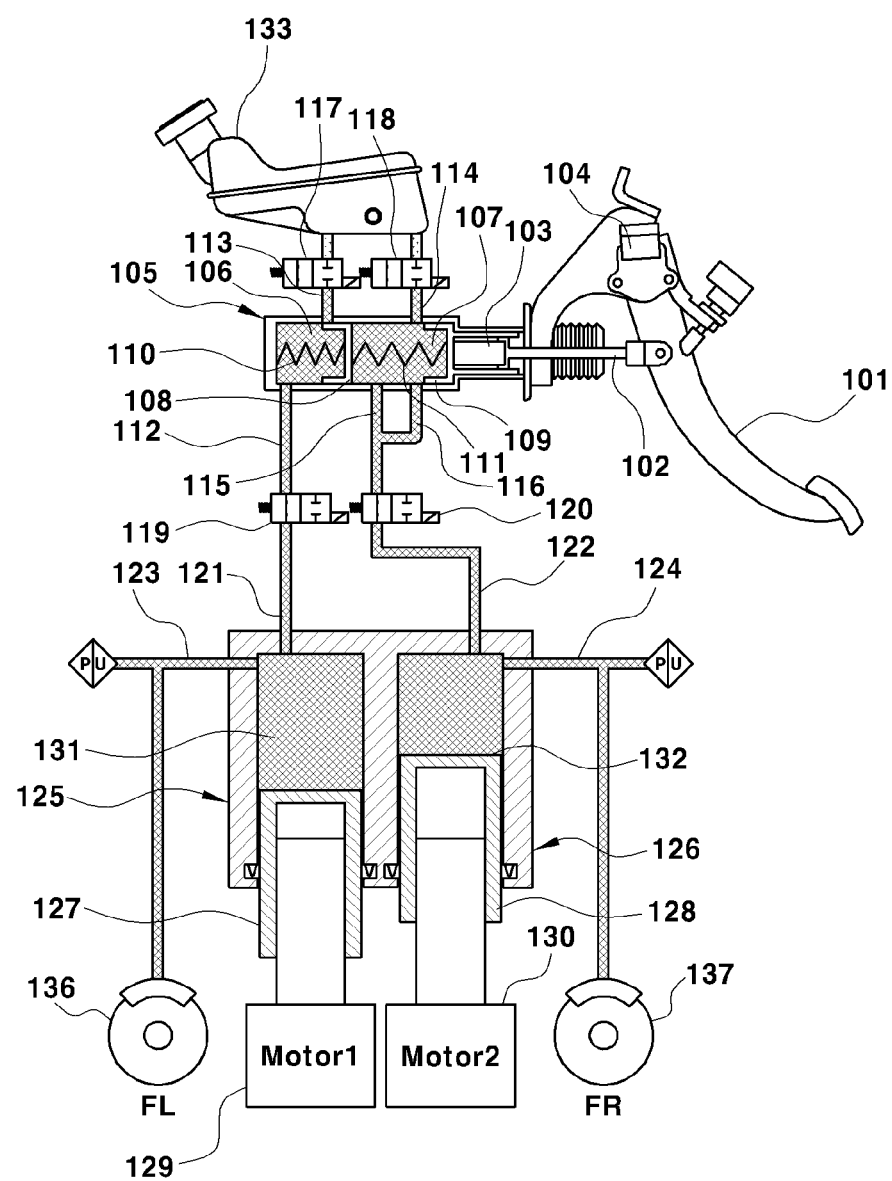
FIG. 3E shows that the braking is performed when the actuator fails according to an exemplary embodiment of the present invention.
Figure 3F:
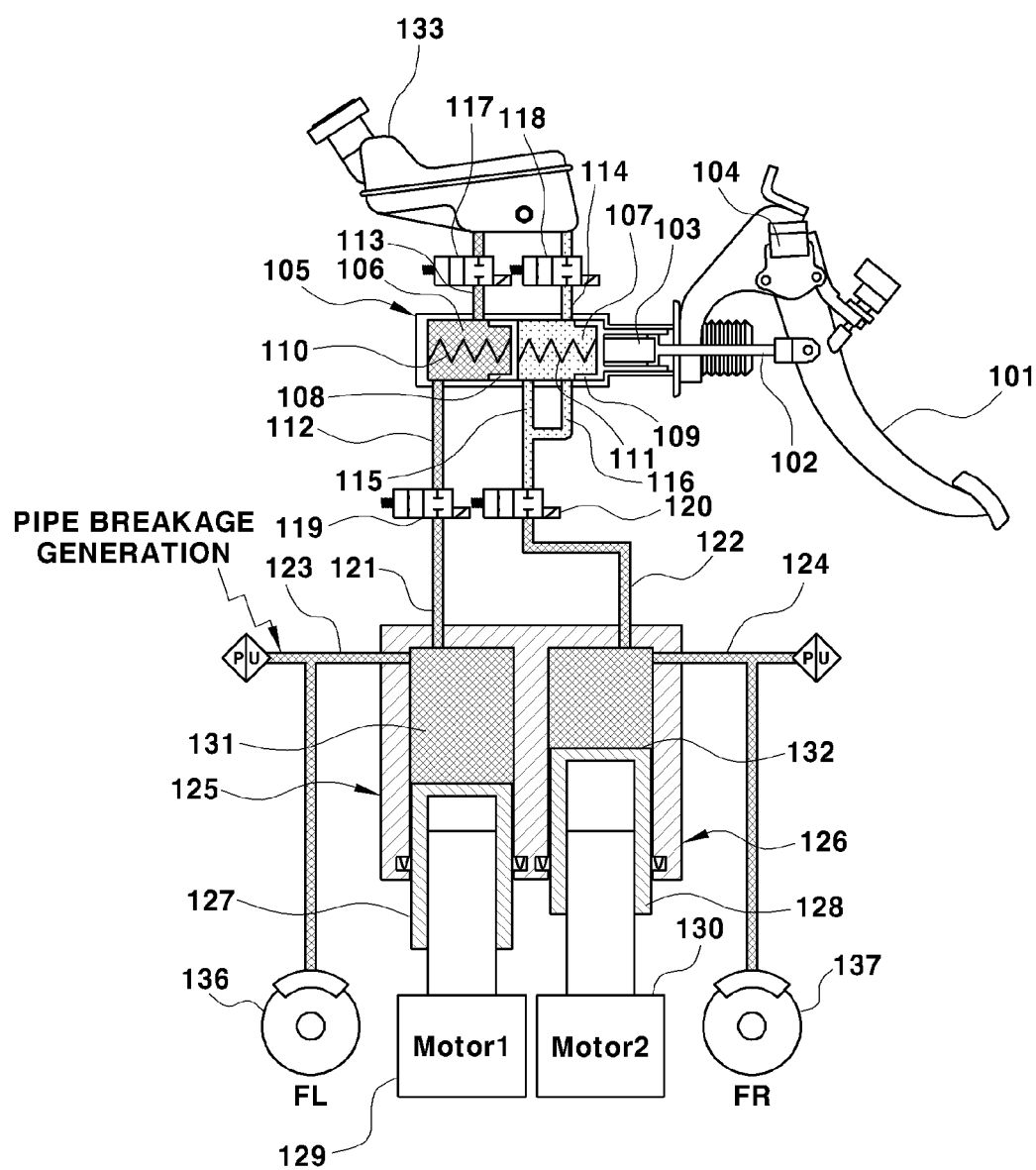
FIG. 3F shows that the braking is performed when some pipe breakage occurs according to an exemplary embodiment of the present invention.
Figure 3G:
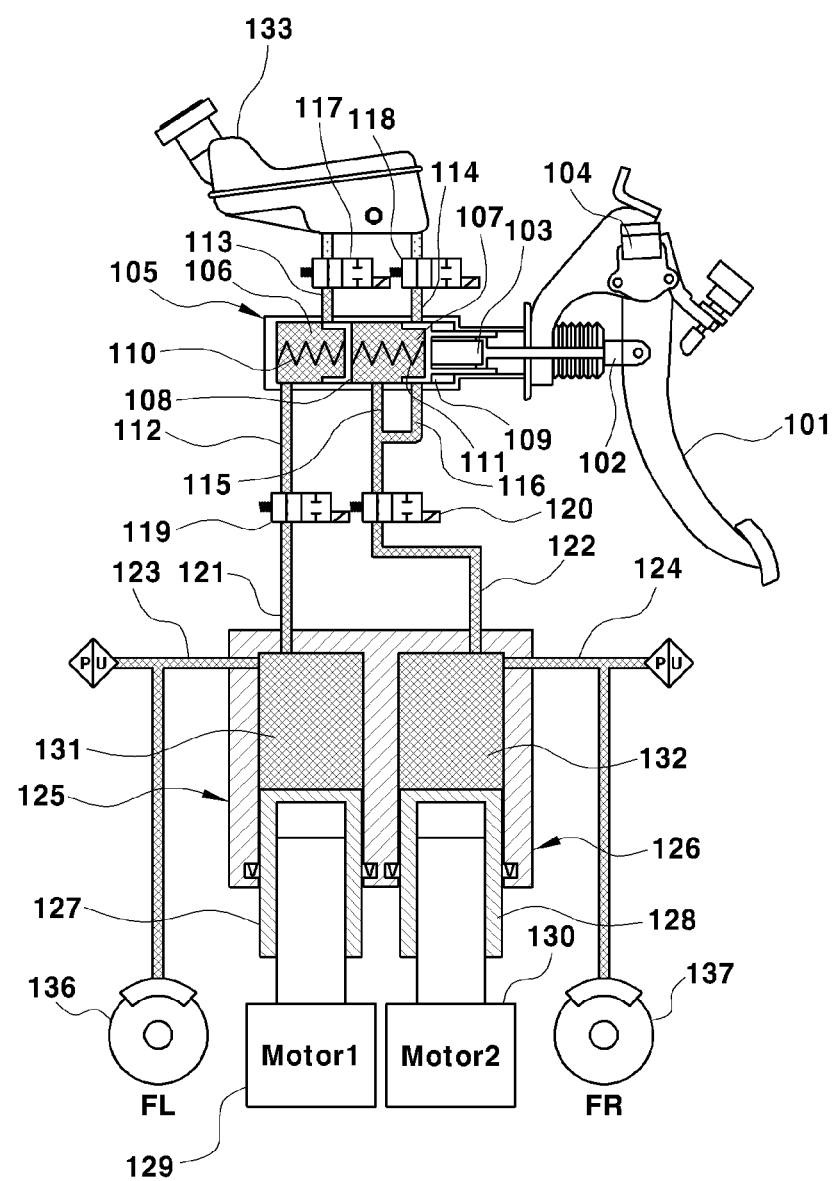
FIG. 3G shows a state in which the backup braking is performed only with the pedaling force due to an electrical failure generation according to an exemplary embodiment of the present invention.

FIGS. 3A to 3G show examples in which the braking module for the front wheels operate according to various states of the vehicle. First, FIG. 3A shows an initial state of the braking system for the vehicle before braking, and FIG. 3B shows the operation of the braking system for the vehicle during normal braking. In the initial state before braking, the first valve 119, the second valve 120, the third valve 117 and the fourth valve 118 are all in open state. When the braking is performed, the controller 135 may be configured to close all the first valve 119, the second valve 120, the third valve 117 and the fourth valve 118, and operate the first motor 129 and the second motor 130 based on the braking input detected from the pedal sensor 104 to generate a braking force for each wheel.

Further, FIG. 3C shows the pressure balancing performed in the initial stage of rapid braking. In the early stage of rapid braking the motions of the motors are not exactly matched. As shown in FIG. 3C, the motor does not operate uniformly. For example, as shown FIG. 3C, the first motor 129 on the left side may be in a state of for g a braking pressure larger than the braking pressure by the second motor 130 during rapid braking. The pressure balancing may be performed while the first sub-piston 108 moves to the right.

In particular, since the first hydraulic chamber 131 and the second hydraulic chamber 132 must communicate with the third hydraulic chamber 106 and the fourth hydraulic chamber 107 of the sub-cylinder 105 side for the pressure balancing, respectively, the first valve 119 and the second valve 120 may be opened. In the opposite case, that is, when the second motor 130 forms a braking pressure larger than the braking pressure by the first motor 129, as shown in FIG. 2B, left and right braking forces may be formed equally through the pressure balancing operation in the sub-cylinder 105.

In the exemplary embodiment of the present invention, the controller 135 may be configured to determine whether there is a rapid braking action, and when the braking input detected from the pedal sensor exceeds a predetermined reference value, the controller 135 may be configured to determine that the vehicle is in a rapid braking situation. The braking input may be a parameter such as pedal acceleration or pedal stroke, and so on.

Further, FIG. 3D shows a state in which the biased braking is achieved based on the ABS or ESC operation. When ABS or ESC control is achieved, the actuator may be intentionally operated unevenly to generate the biased braking. Therefore, in this ABS or ESC control state, the system must be operated to prevent the activation of the pressure balancing function of the sub-cylinder 105, and thus, the first valve 119 and the second valve 120 may be shut off. Accordingly, as the first valve 119 and the second valve 120 are closed, the first hydraulic chamber 131 and the second hydraulic chamber 132 may be completely separated, and thus, as shown in FIG. 3D, a substantial braking pressure may be applied to the right wheel.

FIG. 3E illustrates when the actuator is broken or has malfunctioned and shows a case where a failure occurs in the first motor 129. In the event of failure of the first motor 129, it may be difficult to provide braking force to the left wheel with the normal braking mode, and thus, the braking pressure formed in the second hydraulic chamber 132 may be transmitted to the first hydraulic chamber 131 side by communicating the first hydraulic chamber 131 and the second hydraulic chamber 132. In particular, since braking pressure by one motor is distributed to left and right sides, loss of braking force occurs but braking stability may be improved since braking of four wheels is possible. Conversely, if only the second motor 130 fails, the braking control may be performed by the first motor 129. Therefore, even if a failure occurs in one of the motors, braking may be performed by another one normal motor.

Additionally, FIG. 3F shows the case where braking control is performed when pipe breakage to the left side occurs. In particular, if the valve on the side where the pipe breakage occurred is opened, all the oil of the hydraulic pressure line may be consumed. Therefore, at this time, the first valve 119 and the second valve 120 may be closed to minimize the oil consumption by completely separating the portion where the pipe breakage occurred, and a braking force is generated only by the normally operated actuator. On the other hand, FIG. 3G shows emergency braking situation using the driver's pedaling force due to the failure of the electrical system.

As shown in FIG. 3G, in the event of an electrical system failure, both the first motor 129 and the second motor 130 become inoperable. In the exemplary embodiment of the present invention, emergency braking may be performed using the pedaling force of the driver even when an electrical system fails. In the emergency operation, the first sub-piston 108 and the second sub-piston 109 inside the sub-cylinder 105 may be actuated to apply a braking force to each wheel. The first valve 119, the second valve 120, the third valve 117 and the fourth valve 118 may be open and the upper valves may be configured to normally open valves.

Figure 4:
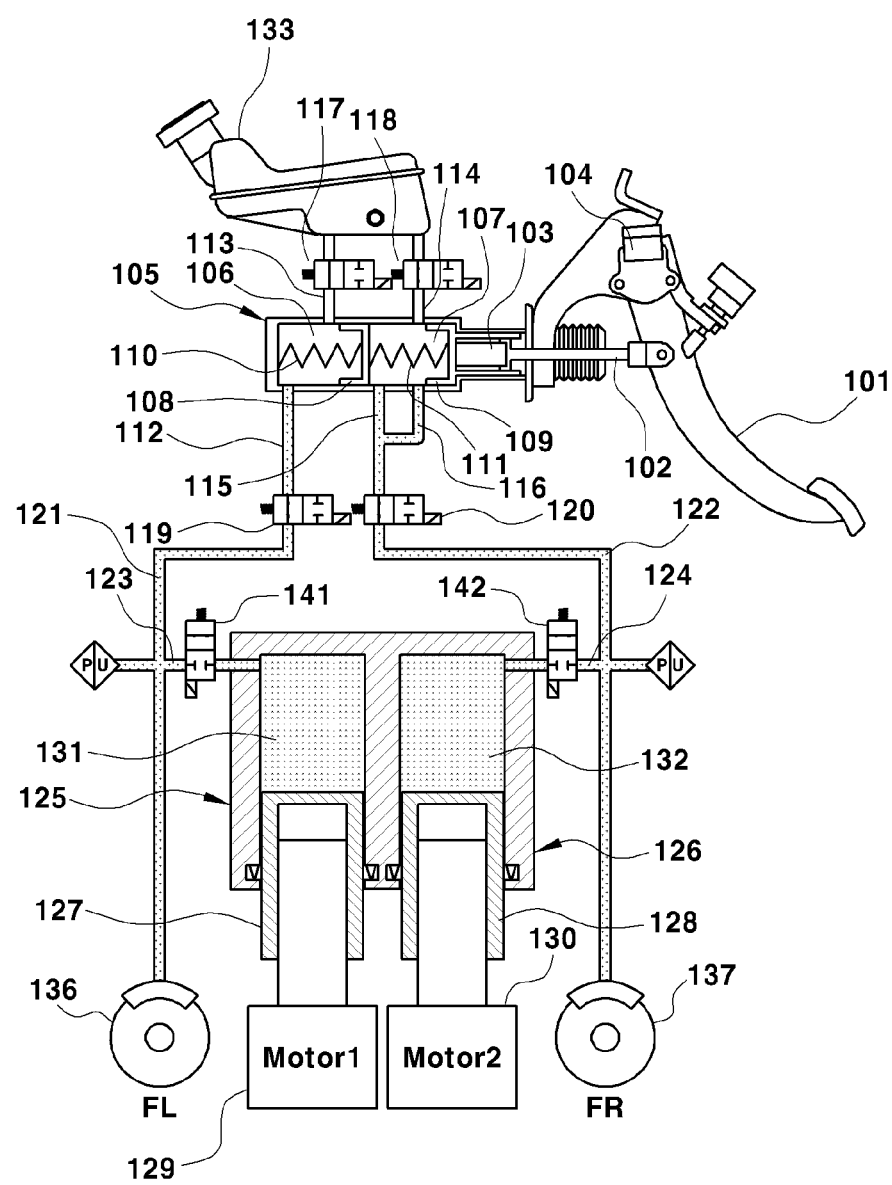
FIG. 4 shows a braking system for a vehicle according to another exemplary embodiment of the present invention.

FIG. 4 shows a braking device for a vehicle according to another exemplary embodiment of the present invention. FIG. 4 is the same as all the configuration of FIGS. 3A-3G except for the flow structure connected to the first hydraulic chamber and the second hydraulic chamber and the added valves. In other words, as shown in FIG. 4, the flow paths 121 and 122 at the rear ends of the first valve and the second valve may be directly connected to the wheel braking side, and a fifth valve 141 and a sixth valve 142 may be further provided between the flow paths 121 and 122 and the first hydraulic chamber 131 and the second hydraulic chamber 132, respectively.

The added valve may be configured to selectively connect hydraulic pressure lines between actuator and wheel brakes. The number of valves may be increased as needed. Unlike in FIG. 4, a number of wheels may be configured to be braked by hydraulic pressure through each actuator by including an increased number of such valves. The fifth valve 141 and the sixth valve 142 may be composed of normally closed valves. In normal braking, the valve may be opened and thus, a braking force by the actuator may be applied to the wheel brakes. When the actuator fails or the electrical system fails, the valve may be automatically shut off, and the operation when valve is shut off is the same except that the fluid does not go through the first hydraulic chamber 131 and the second hydraulic chamber 132.

In this regard, in the exemplary embodiment as shown in FIG. 1, a braking loss may be generated to return the displacement amount of the piston already operated before the actuator failure in the emergency braking situation, but according to the exemplary embodiment as shown in FIG. 4, there is a merit that may prevent such braking loss occurrence by closing the fifth valve 141 and the sixth valve 142.

Although the present invention has been described with reference to an exemplary embodiment, it is to be understood that a person skilled in the art may modify and change the elements of the present invention within the range of the present invention. In addition, many changes may be made to specific situations or materials within a range that does not deviate from the essential areas of the present invention. The present invention, therefore, is not to be limited to the detailed description of the exemplary embodiments of the present invention, but will include all embodiments within the scope of the appended claims.

What is claimed is:

1. A brake system for a vehicle, comprising:
   a pedal to which a braking input is applied;
   an actuator part configured to generate a braking hydraulic pressure in response to the braking input applied to the pedal and including a first actuator having a first hydraulic chamber and a second actuator having a second hydraulic chamber;
   wheel brakes connected with the first actuator and the second actuator; and
   a sub-cylinder including two sub-pistons for forming a third hydraulic chamber and a fourth hydraulic chamber, which are two hydraulic chambers continuously disposed within a housing;
   wherein the sub-cylinder includes a first sub-piston located centrally and a second sub-piston connected to the pedal,
   wherein the sub-cylinder includes an inlet side structure with a stepped portion,
   wherein a portion of the sub-cylinder where the second sub-piston is connected to the pedal has a smaller outer diameter than another portion of the sub-cylinder that extends toward the fourth hydraulic chamber,
   wherein the first hydraulic chamber is connected with the third hydraulic chamber by a flow path in which a first valve is installed, the second hydraulic chamber is connected with the fourth hydraulic chamber by a flow path in which a second valve is installed, and pressure balancing is performed by the sub-cylinder when a difference between braking hydraulic pressures generated by the first actuator and the second actuator occurs,
   wherein the fourth hydraulic chamber is connected with a first flow path proximate to the first sub-piston and a second flow path,
   wherein the first flow path and the second flow path are connected with the second valve, and
   wherein the first sub-piston divides the third hydraulic chamber and the fourth hydraulic chamber, and when the first flow path is closed by the first sub-piston by a pressure difference between the third hydraulic chamber and the fourth hydraulic chamber, a braking force by the pressure balancing is transmitted to the second hydraulic chamber through the second flow path.

2. The brake system for the vehicle of claim 1, further comprising:
   a reservoir connected to the third hydraulic chamber and the fourth hydraulic chamber, respectively.

3. The brake system for the vehicle of claim 2, further comprising:
   a third valve mounted in the flow path that connects the reservoir and the third hydraulic chamber and a fourth valve mounted in the flow path that connects the reservoir and the fourth hydraulic chamber.

4. The brake system for the vehicle of claim 3, further comprising:
   a pedal sensor configured to detect an input from the pedal; and
   a controller configured to perform braking control based on an output of the pedal sensor;
   wherein the controller is configured to operate the actuators and the valves.

5. The brake system for the vehicle of claim 4, wherein the controller is configured to close all of the first valve, the second valve, the third valve and the fourth valve in normal braking situation, and operate the first actuator and the second actuator based on the braking input detected from the pedal sensor to generate a braking force of each wheel.

6. The brake system for the vehicle of claim 4, wherein the controller is configured to detect a rapid braking situation when the braking input detected from the pedal sensor exceeds a predetermined reference value, and is configured to open the first valve and the second valve to perform pressure balancing while the third valve and the fourth valve are closed.

7. The brake system for the vehicle of claim 4, wherein the controller is configured to close all of the first valve, the second valve, the third valve and the fourth valve to control each wheel independently when an anti-lock brake system (ABS) or an electronic stability control (ESC) control is performed.

8. The brake system for the vehicle of claim 4, wherein in the event of a failure in the first actuator or the second actuator, the controller is configured to open the first valve and the second valve in a state of closing the third valve and the fourth valve to perform braking through an actuator that does not generate a failure.

9. The brake system for the vehicle of claim 4, wherein the controller is configured to close all of the first valve, the second valve, the third valve and the fourth valve to independently control each wheel when oil leakage occurs in some of the hydraulic pressure lines.

10. The brake system for the vehicle of claim 4, wherein the first valve, the second valve, the third valve and the fourth valve all are configured to normally open valves; and in the event of an electrical failure in the braking system of the vehicle, the first valve, the second valve, the third valve and the fourth valve are all opened to allow the braking force based on a pedaling force to be supplied to each wheel.

11. The brake system for the vehicle of claim 3, wherein the third valve and the fourth valve are normally open valves.

12. The brake system for the vehicle of claim 3, wherein the flow path in which the first valve is installed and the flow path in which the second valve is installed are directly connected to the wheel brakes; and a fifth valve is installed between one of the wheel brakes and the first actuator and a sixth valve is installed between another one of the wheel brakes and the second actuator.

13. The brake system for the vehicle of claim 1, wherein the fourth hydraulic chamber is a hydraulic chamber divided by the first sub-piston and the second sub-piston and a y shaped flow path is connected with the fourth hydraulic chamber.

14. The brake system for the vehicle of claim 13, wherein the y shaped flow path is formed along the longitudinal direction of the sub-cylinder and includes two ports connected with the fourth hydraulic chamber.

15. The brake system for the vehicle of claim 1, wherein the first sub-piston divides the third hydraulic chamber and the fourth hydraulic chamber, and the first sub-piston is movable within the sub-cylinder based on a pressure difference between the third hydraulic chamber and the fourth hydraulic chamber.

16. The brake system for the vehicle of claim 1, wherein the first valve and the second valve are normally open valves.

17. The brake system for the vehicle of claim 1, wherein the first actuator includes a first motor, a first main piston moved back and forth by the first motor and a first main cylinder accommodating the first main piston and the second actuator includes a second motor, a second main piston moved back and forth by the second motor and a second main cylinder accommodating the second main piston.

18. The brake system for the vehicle of claim 1, wherein the second sub-piston is a stepped piston and in an initial state thereof abuts the stepped portion formed in the sub-cylinder.

19. The brake system for the vehicle of claim 1, wherein a pedal simulator is installed between the second sub-piston and the pedal.

20. The brake system for the vehicle of claim 1, wherein the sub-cylinder further includes:
- a restoring spring for returning positions of the first sub-piston and the second sub-piston to a predetermined position.

* * * * *